United States Patent [19]
Barber et al.

[11] Patent Number: 5,208,499
[45] Date of Patent: May 4, 1993

[54] EMI/RFI SUPPRESSING BRUSH HOLDER ASSEMBLY FOR ELECTRIC MACHINES

[75] Inventors: Harry C. Barber, Chesterfield; Kenneth P. Green, Lurenburg; Otway A. Southall, Farmville, all of Va.

[73] Assignee: Carbone-Lorraine of North America, Parsippany, N.J.

[21] Appl. No.: 821,995

[22] Filed: Jan. 16, 1992

[51] Int. Cl.⁵ .......................... H02K 5/24; H02K 13/00
[52] U.S. Cl. ....................................... 310/51; 310/239; 310/251
[58] Field of Search .................. 310/51, 239, 242, 245, 310/247, 248, 251

[56] References Cited

U.S. PATENT DOCUMENTS

| | | | |
|---|---|---|---|
| 3,792,298 | 2/1974 | Hamman | 310/242 |
| 4,590,398 | 5/1986 | Nagamatsu | 310/239 |
| 4,845,393 | 7/1989 | Burgess et al. | 310/51 |
| 4,855,631 | 8/1989 | Sato et al. | 310/239 |

Primary Examiner—Steven L. Stephan
Assistant Examiner—Matthew Nguyen
Attorney, Agent, or Firm—Charles W. Helzer

[57] ABSTRACT

A commutating brush assembly for rotating electrical equipment is constructed to suppress electromagnetic/radio frequency interference emissions, particularly in the radio frequency range. This is achieved by fabricating the EMI/RFI suppressing brush holder assembly from a material that itself suppresses EMI/RFI emissions generated by electromagnetic apparatus such as motors, generators, rotary switch gears, etc. The EMI/RFI emission suppression capability of the novel assembly may be further enhanced by the addition of certain add-on electrical components such as capacitors or radio frequency choke coils and the like.

20 Claims, 1 Drawing Sheet

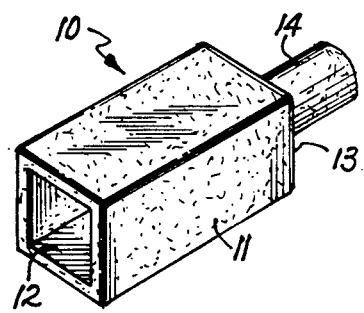
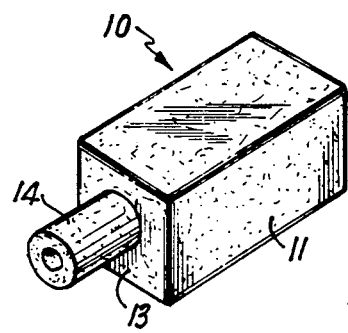
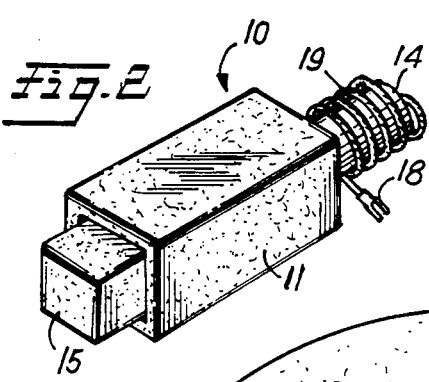
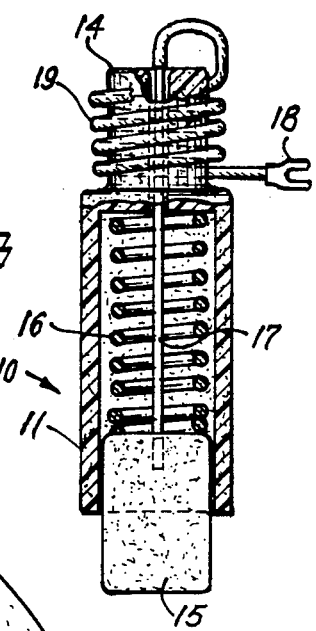
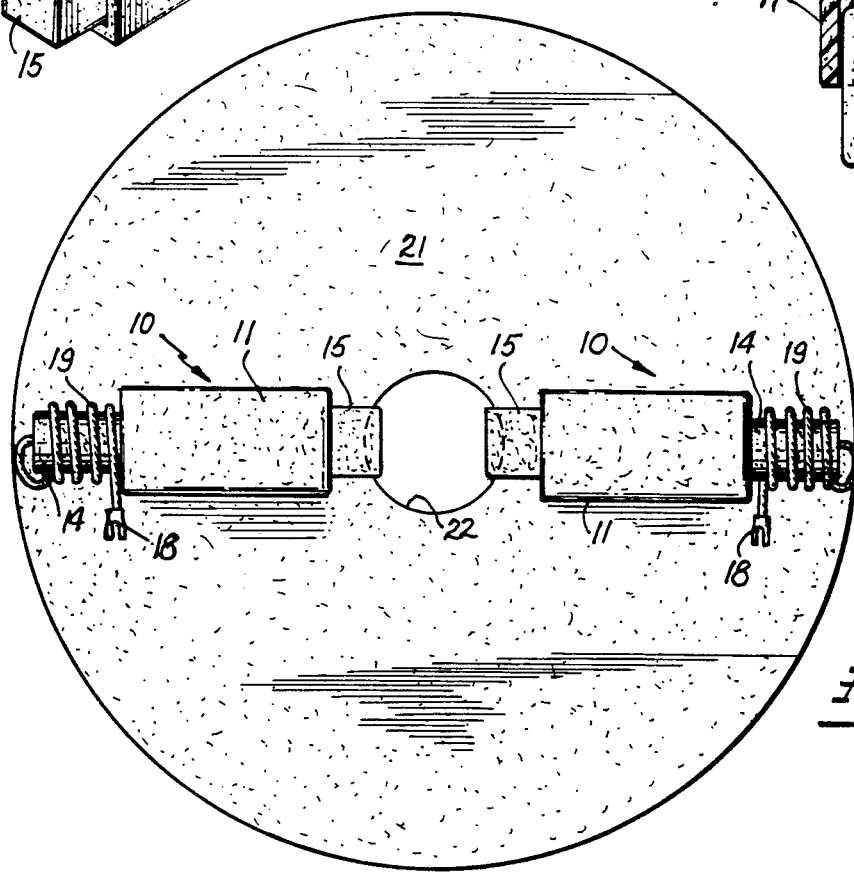

EMI/RFI SUPPRESSING BRUSH HOLDER ASSEMBLY FOR ELECTRIC MACHINES

FIELD OF INVENTION

A novel commutating brush holder assembly is provided which is constructed of materials to suppress electromagnetic interference, particularly in the radio frequency and higher ranges of the frequency spectrum. The novel brush holder assembly is composed of a material such as ground ferrite-based materials suspended in a plastic carrier that suppresses the EMI generated by electric motors, generators, switch gear and like equipment which produce EMI emissions during operation. The assembly may also be used in conjunction with certain performance enhancement add-on suppression components such as radio frequency choke coils, capacitors and the like.

BACKGROUND OF INVENTION

This invention relates to a novel method with materials and devices for the suppression of electromagnetic interference, particularly within the radio frequency range. More specifically the invention relates to the material of construction and design of brush holder assemblies used with commutating brushes for electric motors, generators and other rotating electrical equipment such as rotary switches.

Commutating brushes are used to maintain electrical contact between a stationary member (or stator) and a rotating member (or rotor) of rotating electrical equipment such as electric motors, generators, rotary switches, and the like. In most such equipment there is a normal current reversal and electrical connection dynamics involved in the operation of commutating devices which results in the generation of electromagnetic interference (EMI). This EMI may be conducted and/or radiated to neighboring machines and devices and result in interfering with the operation of such neighboring machines and devices thus causing serious reliability or performance problems in complex electrical systems such as those utilized in automobiles, airplanes, etc. Of particular concern are EMI signals lying within the radio frequency range referred to as radio frequency interference signals (R.F.I.), (including not only the broadcast AM and FM portions of the frequency spectrum, but extending up to and including the microwave regions. Previously, EMI/RFI has been suppressed using various add-on combinations of electrical components which are directly added to the electrical system or systems which might be affected by EMI/RFI. Capacitors and radio frequency choke coils are added in various configurations to contain EMI/RFI near its point of origin or at distant points to filter the radio signals at the point of reception. For example, U.S. Pat. No. 3,189,824 discloses the use of RFI suppression circuitry at the reception end in order to improve the performance of a radio receiver. U.S. Pat. No. 4,845,393 discloses the use of an EMI/RFI suppression circuit in the construction of an integrally built fuel pump end cap for reduction of EMI/RFI emissions from or by the fuel pump.

The present invention provides a novel means for suppressing EMI/RFI at its point of origin by utilizing EMI/RFI suppressing materials in the construction of a brush holder assembly on an electric machine such as an electric motor, electric generator rotary electric switch, and the like. The EMI/RFI suppression is achieved as a result of the material composition of the brush holder assembly. If desired, the EMI/RFI suppression may be further enhanced by the use of add-on electrical components such as capacitors or radio frequency choke coils. However, the invention does not require the use of such additional circuit components to suppress EMI/RFI. It also provides for the integration of commutating brushes contracts, springs, shunt wires and add-on EMI/RFI in addition to that achieved through the materials used in fabricating commutating brush holder assemblies and like switching devices with considerable design flexibility and wide ranging applications..

SUMMARY OF INVENTION

This invention provides novel commutating brush holder assemblies and like switching devices for use with electric motors, generators and other switch gear such as rotary switches and similar equipment. The brush holder assembly provided by the invention is composed of EMI/RFI suppressing materials that during operation functions to suppress EMI/RFI, and is physically configured to optimize the EMI/RFI suppression function of the materials.

In a particular basic embodiment of the invention, the novel EMI/RFI suppressing brush holder assembly simply is fabricated from an EMI/RFI suppressing material consisting essentially of a high magnetic permeability, granulated ferrite powder, or the like, dispersed and suspended in a molded carrier material such as polyphenylene sulfide, phenolic resin, or other similar polymeric insulating material. In another embodiment of the invention, a brush holder assembly such as that described above, is combined with a commutating brush, spring, shunt wire and wire coil wound around gf. the assembly as a choke coil to enhance EMI/RFI suppression at its point of origin. In still another embodiment of the invention, multiple commutating brush holder assemblies are mounted around the armature of an electric motor or generator on an insulating support member which also can be fabricated from EMI/RFI suppressing material.

BRIEF DESCRIPTION OF DRAWINGS

The above and other objects, features and many of the attendant advantages of this invention will be appreciated more readily as the same becomes understood from a reading of the following detailed description when considered in connection with the accompanying drawings, wherein like parts in each of the several figures are identified by the same reference characters, and wherein:

FIG. 1 in conjunction with FIG. 1A illustrates a basic form of EMI/RFI suppressing brush holder assembly constructed according to the invention, wherein FIG. 1 is a perspective end view of the lower end of the brush holder assembly, and FIG. 1A ia perspective end view from the opposite upper end of the assembly from that shown in FIG. 1;

FIG. 2 is a perspective end view of a brush holder assembly as shown in FIGS. 1 and 1A and further including a commutating brush mounted therein together with an add-on RFI suppressing choke coil;

FIG. 3 is a longitudinal sectional view of the brush holder assembly illustrated in FIG. 2, taken through plane 3—3 of FIG. 2; and FIG. 4 is a multiple, EMI/RFI suppressing brush holder assembly mounted on an insulating base plate of EMI/RFI suppressing material for use with rotating electrical equipment requiring multiple commutating brushes and the like.

DETAILED DESCRIPTION OF PREFERRED EMBODIMENT

FIG. 1 is a perspective, overall lower end view of a preferred form of EMI/RFI suppressing brush holder assembly comprising the invention. In FIG. 1, a brush holder assembly is shown and comprises a hollow, box-shaped body member having elongated sides 11 integrally formed into the closed box-shaped body member 10. Body member 10 has an open lower end 12 into which a commutating brush or other similar, sliding contact member is slidably fitted. The remaining upper end of the body member 10 is closed by an integrally formed cap 13 on which an elongated, cylindrical, solid tube-shaped pedestal 14 also is integrally formed with the end cap 13 and sides 11.

The body member 10 including sides 11, end cap 13 and pedestal 14 consists essentially of ground ferrite-based materials either in powder or particulate form mixed with a polymeric plastic material such as polyphenylene sulfide, phenolic resin, nylon, or other similar plastic material. The ferrite-based particulates are magnetically susceptible and function within the brush holder assembly to suppress EMI/RFI. The polymer functions as a carrier for supporting the particulate, ferrite-like material in a suspended solid state after the two materials have been mixed with the particulate, ferrite-like material interspersed in the plastic carrier and molded into a desired physical configuration such as shown in FIG. 1. This can be achieved by injection molding or other similar process. After hardening, the polymer functions not only to hold the ferrite-like particulates in their suspended state, but provides mechanical strength and electrical and chemical resistance to the brush holder body member 10. The relative proportions of polymer to ferrite-like mater in the mixture may be varied to achieve optimum EMI/RFI suppressing characteristics in a cost effective composition having desired predetermined electrical resistivity characteristics necessary to meet performance requirements as required by particular applications in which the invention is to be used.

A particular example of an EMI/RFI suppressing brush holder assembly according to the invention was built and tested wherein a cylindrical-shaped body member, similar to FIGS. 1 and 1A, having a hollow, open end bottom portion for receiving and supporting a commutating brush and a solid, tubular-shaped top portion was fabricated from four (4) parts of commercially available, fired #43 ferrite powder suspended in the molded, cylindrically-shaped, body member with one (1) part R-6 (PPS) commercially available, polymeric plastic binder. The brush holder thus formed was provided with a shunt wire connected through the body member between the inner end of a commutating brush supported in the hollow, open bottom end of the brush holder block and a suitable power supply terminal. Test results established that the abovenoted composition effectively suppressed EMI/RFI emissions in the 10 Kilohertz, 27 Megahertz and 100 Megahertz frequency bands.

While ferrite-based materials have been described as the preferred magnetically susceptible material to be used in forming the molded brush holder assembly body member 10, it is believed obvious to those skilled in the art that other suitable materials having similar magnetic and electrical characteristics to ferrites, and which can be suspended in a suitable insulating plastic carrier, could satisfactorily be used to practice the invention. Similarly, while a polymeric moldable material has been described as preferable for use as the moldable, solid carrier, other known moldable, electrically insulating, plastic materials can be used which are capable of holding the particulate, ferrite-like material in a fixed physical configuration to provide the EMI/RFI suppression capabilities to a molded body member such as 10.

FIGS. 2 and 3 of the drawings show a preferred form of finished brush holder assembly 10 having a commutating brush 15 slidably supported in the open, lower end 12 of body member 10. The commutating brush 15 preferably is a carbon or graphite brush having a substantially free end for slidably engaging and electrically contacting a commutator or other similar, rotating, contact-making surface. The remaining end of brush 15 is slidably supported within the body of brush holder assembly 10 and is engaged by a coiled compression spring 16 for outwardly pressing the free end of the brush 15 into contact with a commutator or other rotating surface. While the commutating brush and holder have been illustrated as rectangular or square in configuration, they may have any practical shape or configuration best suited to meet the needs of a particular installation. The brush 15 may consist of a conventional, commercially available carbon brush material of known manufacture or commercially available graphite material, depending upon the nature of commutating application with which it is used.

To finish off the brush assembly into a workable commutating device, the inside end of carbon brush 15 is electrically connected to a shunt wire 17 having one end connected to the inside end of carbon brush 15 in a known manner and terminating in power supply terminal 18. Electric current flow through the brush assembly thus comprised takes place through commutating brush 15, shunt wire 17 and terminal 18 or vice versa. Terminal 18 of course provides an easy means for connection to or from a power supply for the electric current flow. The structure thus far described (with nothing more) can and does operate satisfactorily as an EMI/RFI suppressing commutating brush assembly for use with electric motors, generators and other rotating or reciprocating type, mechanically switched, electric switch gear.

For certain installations where it is desirable to achieve the greatest possible degree of EMI/RFI suppression at its point of generation, an optional radio frequency choke coil is formed by winding the shunt wire 17 around the tube-like, columnar end 13 of EMI/RFI suppressing body member 10 whereby the columnar end 13 of the body member serves as a coil form in fabricating a radio frequency choke coil with shunt wire 17. The number of turns provided in coil 19 as well as the number of coils formed can be varied depending upon the particular application and suppression requirements of the suppressing brush holder assembly.

FIG. 4 of the drawings illustrates a preferred form of multiple, EMI/RFI suppressing brush holder assemblies 10 mounted on an insulating support plate 21 with the free movable ends of the commutating brushes 15 thereof supported around an aperture opening 22 in plate 21 in a manner such that the commutating brushes 15 will slidably contact the rotating surface of an armature, or other rotating contact member surface, located within the aperture 22. The assemblies 10 each are identical to the assembly shown and described with relation to FIGS. 2 and 3 of the drawings so they need not be described again in detail.

The insulating plate 21 comprises a generally flat, electrically insulating brush holder support plate fabricated from EMI/RFI suppressing material as described above. If desired the plate 21 may constitute the plate 11 of the brush holder assembly having snap-in replaceable commutator brush holder cartridges for electric machines, described and claimed in co-pending U.S. application Ser. No. 07/624,353–filed Dec. 7, 1990, Otway A. Southall, Inventor, and assigned to Carbone of America, the disclosure of which hereby is incorporated into this application in its entirety. In the event that the brush holder assembly disclosed in application Ser. No. 07/624,353 is employed, then the brush holder body members 10 would be modified in configuration during molding to conform to the construction of the brush holder assemblies as shown in FIGS. 2 and 3 of co-pending U.S. application Ser. No. 07/624,353. In other words, the brush holder assembly shown in FIGS. 2 and 3 of the above-incorporated application Ser. No. 07/624,353 would be fabricated from EMI/RFI suppressing materials as taught and claimed in this application.

COMMERCIAL APPLICATION

The invention provides an EMI/RFI suppressing brush holder assembly which is composed of materials that suppress EMI/RFI and is constructed in a manner to optimize the function of RFI suppressing material during operation of the commutating brush holder assembly. Although RFI suppression may be further enhanced by the use of additional electronic components such as RF capacitors or radio frequency choke coils, the invention does not require the use of such additional components to suppress RFI. The invention also can be modified to include integration of brushes, springs, shunt wires and additional RFI suppression choke coils or capacitors into a single, discrete brush holder assembly with considerable design flexibility and a wide ranging number of applications. These applications include automotive and aerospace electronic installations where spurious EMI/RFI emissions can seriously impair reliable operation of the electronic systems in question.

Having described two embodiments of an EMI/RFI suppressing brush holder assembly for electric machines constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. An EMI/RFI suppressing brush holder assembly for electric machines comprising at least in part a high permeability, magnetically susceptible, ferrite-based material in powder or granular form suspended in a molded plastic carrier configured to physically support a commutating brush and similar electrical contact-making devices in juxtaposition to and physically contacting a moving electrical contact-making mechanism for making and breaking closed electrical circuit connections to said mechanism.

2. An EMI/RFI suppressing brush holder assembly according to claim 1 wherein the proportion of ferrite-based material suspended within the molded plastic carrier is tailored to provide a predetermined desired magnetic susceptibility in the electrical path to the commutating brush and other similar electrical contacting making devices employed with the assembly.

3. An EMI/RFI suppressing brush holder assembly according to claim 2 wherein the molded plastic carrier consists essentially of a molded polymer such as polyphenylene sulfide, a phenolic resin, nylon, and the like.

4. An EMI/RFI suppressing brush holder assembly according to claim 3, further including optional RFI suppression enhancing coils, capacitors, springs or brushes with corresponding shunt wires and terminals as needed in a particular installation for which the system is designed.

5. An EMI/RFI suppressing multi-brush assembly according to claim 4 wherein there are a multiplicity of EMI/RFI suppressing brush holder assemblies each constructed according to claim 1 and wherein the multiplicity of brush holder assemblies are supported on a common support plate fabricated from EMI/RFI suppressing material and arranged to have a free end of the commutating brush seated therein contact an electric motor or generator movable armature.

6. An EMI/RFI suppressing brush holder assembly according to claim 2 further including optional RFI suppression enhancing coils, capacitors, springs or brushes with corresponding shunt wires and terminals as needed in a particular installation for which the system is designed.

7. An EMI/RFI suppressing brush holder assembly according to claim 1 wherein the molded plastic carrier consists essentially of a molded polymer such as polyphenylene sulfide, a phenolic resin, nylon, and the like.

8. An EMI/RFI suppressing brush holder assembly according to claim 1 further including optional RFI suppression enhancing coils, capacitors, springs or brushes with corresponding shunt wires and terminals as needed in a particular installation for which the system is designed.

9. An EMI/RFI suppressing brush holder assembly wherein there are a multiplicity of EMI/RFI suppressing brush holder assemblies each constructed according to claim 1 and wherein the multiplicity of brush holder assemblies are supported on a common support plate fabricated from EMI/RFI suppressing material, and arranged to have a free end of the commutating brush seated therein contact an electric motor or generator movable armature.

10. An electromagnetic/radio frequency interference (EMI/RFI) suppressing material for use in the fabrication of electric motor/generator commutator brush and similar electrical contact-making device holder assemblies; said material consisting essentially of a magnetically susceptible, high permeability ferrite-like material in granular or powder form dispersed and suspended in a molded plastic carrier.

11. An EMI/RFI suppressing material according to claim 10 wherein the ferrite-based material suspended in the plastic carrier is tailored to provide a predetermined desired magnetic susceptibility.

12. An EMI/RFI suppressing material according to claim 11 wherein the plastic carrier consists essentially of a polymer such as polyphenylene sulfide, a phenolic resin, nylon and the like.

13. An EMI/RFI suppressing material according to claim 12 wherein the molded plastic carrier is a solid, electrically insulating plastic carrier configured to physically support a commutating brush or other similar electrical contact-making device in juxtaposition to and electrically contacting a moving electrical contact-making mechanism such as a motor or generator or rotary electrical switch armature.

14. An EMI-RFI suppressing material according to claim 10 wherein the plastic carrier consists essentially of a polymer such as polyphenylene sulfide, a phenolic resin, nylon and the like.

15. An EMI/RFI suppressing material according to claim 10 wherein the molded plastic carrier is a solid, electrically insulating plastic carrier configured to physically support a commutating brush or other similar electrical contact-making device in juxtaposition to and electrically contacting a moving electrical contact-making mechanism such as a motor or generator or rotary electrical switch armature.

16. An electromagnetic/radio frequency interference (EMI/RFI) suppressing brush holder assembly constructed in whole or in part of an EMI/RFI suppressing material for use in commutating device design wherein the material consists of a ferrite-like, high permeability granular material dispersed in a molded solid plastic.

17. An EMI/RFI suppressing brush holder assembly constructed in part or in whole according to claim 16 and further containing optional RFI suppression enhancing coils, springs, and brushes with corresponding shunt wires, and terminals a designed to suit a power supply circuitry requirements.

18. An EMI/RFI suppressing brush holder assembly according to claim 17 wherein the molded solid plastic is a molded polymeric matrix such as polyphenylene sulfide, phenolic resin, nylon, or the like.

19. An EMI/RFI suppressing brush holder assembly according to claim 15 wherein the molded solid plastic is a molded polymeric matrix such as polyphenylene sulfide, phenolic resin, nylon, or the like.

20. A method of suppressing electromagnetic/radio frequency interference (EMI/RFI) emissions generated by commutating brushes for rotating electrical equipment such as electric motors and generators comprising suppressing EMI/RFI emissions at the source thereof by prefabricating commutating brush holder assemblies and other associated physical support structure for the commutating brushes from an EMI/RFI suppressing material which comprises of a high permeability, magnetically susceptible, ferrite-based material in powder or granular form suspended in a molded plastic carrier and physically mounting the commutating brushes in such prefabricated EMI/RFI brush holder assemblies and associated physical support structure during operation of the commutating brush assemblies.

* * * * *

UNITED STATES PATENT AND TRADEMARK OFFICE
CERTIFICATE OF CORRECTION

PATENT NO. : 5,208,499         Page 1 of 2
DATED     : May 4, 1993
INVENTOR(S) : Harry C. Barber, et al It is certified that error appears in the above-indentified patent and that said Letters Patent is hereby corrected as shown below:

Column 1, line 45: delete "(" before "including";
Column 1, line 48: insert --The combined interference effect is referred to as EMI/RFI and covers the entire frequency spectrum.-- after "regions." and before "Previously,";
Column 1, line 57: delete "RFI" and insert --EMI/RFI--;
Column 2, line 35: delete "gf." and insert --a portion of--;
Column 3, line 39: delete "mater" and insert --material--;
Column 5, line 59: delete "EMI/RFI" and insert --electromagnetic/radio frequency interference (EMI/RFI)--;

UNITED STATES PATENT AND TRADEMARK OFFICE
CERTIFICATE OF CORRECTION

PATENT NO. : 5,208,499
DATED : May 4, 1993
INVENTOR(S) : Harry C. Barber, et al

It is certified that error appears in the above-indentified patent and that said Letters Patent is hereby corrected as shown below:

```
Column 6, line 13: delete "," after "3";
Column 6, line 53: delete "the" after "use in";
Column 8, line 3: delete "a" before "designed";
Column 8, line 4: delete "circuitry" and insert --circuit--;
Column 8, line 10: delete "15" and insert --16--;
Column 8, line 16, insert --:-- after "comprising";
Column 2, line 20: insert --,-- after "materials";
Column 2, line 21: delete "functions" and insert --function--;
Column 8, line 21: delete "of" after "comprises".
```

Signed and Sealed this

Twenty-second Day of March, 1994

Attest:

BRUCE LEHMAN

*Attesting Officer*        *Commissioner of Patents and Trademarks*